United States Patent
Kusano et al.

(12)
(10) Patent No.: US 6,602,943 B2
(45) Date of Patent: Aug. 5, 2003

(54) HEAVY DUTY PNEUMATIC TIRE

(75) Inventors: Tomohiro Kusano, Kodaira (JP); Akira Matsuda, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/249,443

(22) Filed: Feb. 12, 1999

(65) Prior Publication Data

US 2001/0053811 A1 Dec. 20, 2001

(30) Foreign Application Priority Data

Feb. 16, 1998 (JP) .......................... 10-032614
Jan. 12, 1999 (JP) .......................... 11-004821

(51) Int. Cl.[7] ................................. C08K 3/34
(52) U.S. Cl. ..................... 524/492; 524/495; 524/496; 152/209.5
(58) Field of Search ................ 524/492, 493, 524/495, 496; 525/322, 324, 326.1, 331.9, 332.3, 333.5, 337.7, 333.9

(56) References Cited

U.S. PATENT DOCUMENTS

| 5,225,475 A | * | 7/1993 | Misono ...................... 524/496 |
| 5,516,833 A | * | 5/1996 | Ohashi et al. ............... 524/495 |
| 5,569,697 A | * | 10/1996 | Ferrandino et al. ......... 524/492 |
| 5,639,817 A | * | 6/1997 | Probst et al. ................ 524/496 |
| 5,696,197 A | * | 12/1997 | Smith et al. ................. 524/495 |
| 5,744,536 A | * | 4/1998 | Matsui et al. ................ 524/492 |
| 5,851,321 A | * | 12/1998 | Midorikawa et al. ....... 152/209 |
| 5,856,393 A | * | 1/1999 | Matsue et al. ............... 524/493 |
| 5,929,157 A | * | 7/1999 | Matsuo ........................ 524/496 |
| 5,985,978 A | * | 11/1999 | Kikuchi et al. ............. 524/495 |
| 6,013,737 A | * | 1/2000 | Takagishi et al. ........... 524/332 |
| 6,211,281 B1 | * | 4/2001 | Kusano ...................... 524/496 |

FOREIGN PATENT DOCUMENTS

| AU | 199712265 B2 | 8/1997 |
| CA | 2166568 | 7/1996 |
| EP | 0 802 223 A2 | 10/1997 |
| ES | 2 080 352 | 2/1996 |
| JP | 5-117450 | 5/1993 |
| JP | 9-268237 | 10/1997 |

* cited by examiner

*Primary Examiner*—Edward J. Cain
*Assistant Examiner*—Katarzyna Wyrozebski Lee

(57) ABSTRACT

In a heavy duty pneumatic tire comprising a tread, the tread is made of a rubber composition comprising 20–67 parts by weight of carbon black and 3–20 parts by weight of silica based on 100 parts by weight of diene based rubber, wherein the carbon black has a ratio of a dibutyl phthalate (DBP) absorption to a 24M4 DBP absorption (DBP absorption/24M4 DBP absorption) of not less than 1.20 and a ratio of the DBP absorption to a nitrogen adsorption specific area ($N_2SA$) of not less than 0.8.

5 Claims, No Drawings

HEAVY DUTY PNEUMATIC TIRE

BACKGROUND OF THE INVENTION

1. Field of the Invention

This invention relates to a heavy duty pneumatic tire, and particularly to improvement of a rubber composition for a tread of the pneumatic tire mounted on a large vehicle which runs on rough roads (so called, an off-the-road tire).

2. Description of Related Art

Up to now, for a heavy duty pneumatic tire for a vehicle running on rough roads attempts has been made to improve low heat build-up, wear resistance, appearance and the like.

In order to improve a tread rubber composition, there are concretely various techniques of selecting the kind of carbon black compounded therein, adjusting the amount of the carbon black and the like.

In general, a predetermined amount of the carbon in the tread rubber composition can improve the tire in the wear resistance and the cutting resistance due to an increased rubber hardness, so that the tire obtains a long life. However, too much carbon black compounded therein lowers not only the workability but also the elongation at the breaking (Eb), so that the cutting resistance and the chipping resistance during running are degraded with consequence of lowering the appearance. Additionally, a large amount of carbon black compounded causes failures such as the heat separation due to high heat build-up and the like.

Further, there is a technique of compounding a resin in the tread rubber composition. The added resin raises the elongation at breaking (Eb) and can improve the appearance, but lowers the wear resistance.

Moreover, there is a technique of blending styrene butadiene rubber (SBR) having a high hardness at a low deformation into natural rubber (NR) having the large elongation at breaking at high temperatures. But the technique has a problem of the heat build-up.

Further, for the purpose of the depress the heat build-up, compounding a solution polymerized SBR which has the low heat build-up brings the low breaking resistance to degrade the appearance in running on rough roads. Therefore, for the purpose of solving the above problem, there is a technique of combining a specific carbon black and the solution polymerized SBR to improve the appearance while keeping the wear resistance and the low heat build-up (see: JP-A-5-117450).

There is, recently, developed a technique of compounding a specific carbon black and silica with isoprene based rubber to make compatible the low heat build-up and the wear resistance without detracting the workability (JP-A-9-268237).

However, a demanded level of improvement is not satisfied.

SUMMARY OF THE INVENTION

It is, therefore, an object according to the invention to improve the appearance, wear resistance, and low heat build-up in a heavy duty pneumatic tire at a higher level.

In order to attain the above object, the heavy duty pneumatic tire according to the invention has the following construction.

A heavy duty pneumatic tire according to the invention is characterized in that a tread rubber of the tire is constructed with a rubber composition comprising 20–67 parts by weight of carbon black and 3–20 parts by weight of silica based on 100 parts by weight of diene based rubber, wherein the carbon black has a ratio of a dibutyl phthalate (DBP) absorption to a 24M4 DBP absorption (DBP absorption/24M4 DBP absorption) of not less than 1.20, and the ratio of the DBP absorption to a nitrogen adsorption specific area ($N_2SA$) of not less than 0.8.

In the above construction, the carbon black preferably has the $N_2SA$ of 120–160 $m^2/g$ and the DBP absorption of 120–150 ml/100 g, and the silica preferably has a $N_2SA$ of 210–260 $m^2/g$ and a DBP absorption of 200–260 ml/100 g. Further, the carbon black preferably has the ratio of the DBP absorption to the 24M4 DBP absorption (DBP absorption/24M4 DBP absorption) of not more than 1.30, and the ratio of the DBP absorption to the $N_2SA$ of 0.82–2.00.

The invention will be described in detail below.

In a tread rubber composition of the heavy duty pneumatic tire according to the invention, the rubber ingredient is defined to be diene based rubber because of a high breaking resistance and a good balance of the low heat build-up and the wear resistance.

Further, diene based rubber preferably usable in the invention is isoprene based rubber. Concretely, at least one selected from the group consisting of natural rubber and isoprene rubber (IR) is preferably of not less than 50% by weight, more preferably not less than 80% by weight, particularly preferably 100% by weight.

With respect to the carbon black according to the invention, the ratio of DBP absorption/24M4 DBP absorption is defined to be not less than 1.20. Because when the ratio is less than 1.20, an elongation of the vulcanized rubber composition is small and hence the appearance is degraded owing to generation of cutting or chipping. Besides, the term "24M4DBP absorption" used in the invention means a DBP absorption after compressing the carbon black four times at 24.000 p.s.i. according to ASTM D3493, and it is adopted for evaluation of primary structure which is not destroyed by mixing etc.

Further, the ratio of DBP absorption/24M4 DBP absorption is preferably not more than 1.30. Because, when the ratio exceeds 1.30, the low heat built-up tends to be degraded.

Further, with respect to the carbon black in the invention, the ratio of DBP absorption/$N_2SA$ is defined to be not less than 0.8, which can bring the desired wear resistance. When the ratio is less than 0.8, wear resistance is not sufficiently improved. The ratio is preferably not more than 1.25, which can bring the larger elongation of the rubber and the improved appearance. Further, when the ratio exceeds 2.00, an elongation of the rubber is not sufficiently improved.

Moreover, the carbon black preferably has the $N_2SA$ of 120–160 $m^2/g$ and the DBP absorption of 120–150 ml/100 g. Because when the $N_2SA$ is less than 120 $m^2/g$ or the DBP absorption is less than 120 ml/100 g, the improvement effect of the wear resistance brought by combination of the carbon black and the silica is not sufficient; while when the $N_2SA$ exceeds 160 $m^2/g$ or the DBP absorption exceeds 150 ml/100 g, the low heat build-up is degraded, and the balance of the wear resistance and the low heat build-up is not improved sufficiently. From the same point of view as in the above, the carbon black preferably has the $N_2SA$ of 130–150 $m^2/g$ and the DBP absorption of 125–140 ml/100 g.

In the invention, the amount of the carbon black compounded is defined to be 20–67 parts by weight based on 100 parts by weight of the diene based rubber. Because, when it is less than 20 parts by weight, wear resistance is not sufficient, while when it exceeds 67 parts by weight, the low heat build-up is degraded.

In the invention, the silica preferably has the $N_2SA$ of 210–260 $m^2/g$ and the DBP absorption of 200–260 ml/100 g. Because the combination of the silica and the carbon black having the properties within the above ranges can bring an optimum dispersion state of the carbon black and the silica, which can make compatible the low heat build-up and the wear resistance. Concretely, when the $N_2SA$ exceeds 260 $m^2/g$, a viscosity of the vulcanized rubber composition rises to decrease workability in manufacturing the tire. When it is less than 210 $m^2/g$, the wear resistance is not improved sufficiently. Further, when the DBP absorption exceeds 260 cc/100 g, the low heat build-up is not improved sufficiently. When it is less than 200 ml/100 g, the good balance of the wear resistance and the low heat build-up is difficult to be kept. From the same point of view as in the above, silica more preferably has the $N_2SA$ of 210–240 $m^2/g$ and the DBP absorption of 220–240 ml/100 g.

Further, the amount of the compounded silica is defined to be 3–20 parts by weight, preferably 5–15 parts by weight based on 100 parts by weight of the diene based rubber. Because, when it is not in this range, the good balance of the wear resistance and the low heat build-up is difficult to be kept.

In the specification and claims of the invention, the $N_2SA$ of the carbon black is measured according to ASTM D4820-93, the DBP absorption thereof ASTM D2414-93, and the 24M4 DBP absorption thereof ASTM D3493; the $N_2SA$ and the DBP absorption of the silica are measured according to the same ways as in the above after drying it at 300° C. for one hour.

Besides, in the invention, in addition to the above ingredients, vulcanizing agent, vulcanization accelerator, vulcanization aids and other additives, which are usually used, may be compounded in the proper amounts.

DESCRIPTION OF PREFERRED EMBODIMENTS

The invention will be explained concretely on the basis of the preferred embodiments below.

Test tires (off-the-road tire: 3700R57) are manufactured under the conventional vulcanization conditions, which respectively have a tread made of a rubber composition whose recipe is shown in Table 1. The tires are examined in the following properties.

(a) Low Heat Build-up

A drum test is conducted under the condition of a fixed speed and a load stepwise added. A temperature is measured at a fixed position inside the tread to calculate a reciprocal of the temperature, and then it is converted to be represented by an index value on basis that Comparative Example 1 is 100. The larger the index value, the lower heat build-up due to the small heat generation.

(b) Wear Resistance

The depth of the groove remained after running for 2000 hours is measured at some places to calculate its average, and then it is converted according to the following formula to be represented by an index value on basis that Comparative Example 1 is 100.

$$(S/C) \times 100$$

wherein S exhibits the average value of the remained groove depth in the test tire, C that of the control tire.

The larger the index value, the higher the wear resistance.

(c) Appearance

The appearance is estimated by judging the appearance of each test tire wore to 60–70%. Concretely, if the test tire has a better appearance than the control tire in Comparative Example 1 of B class has, it is judged as A class; and if worse, C class.

TABLE 1

(unit in compounding: part by weight)

|  | Comparative Example 1 | Comparative Example 2 | Comparative Example 3 | Example 1 | Example 2 | Comparative Example 4 | Comparative Example 5 | Example 3 | Comparative Example 6 | Comparative Example 7 |
|---|---|---|---|---|---|---|---|---|---|---|
| Natural rubber | 100 | 100 | 100 | 100 | 100 | 100 | 100 | 100 | 100 | 100 |
| Carbon black | 50 | 40 | 50 | 40 | 35 | 40 | 50 | 40 | 40 | 40 |
| $N_2SA$ ($m^2/g$) | 143 | 143 | 146 | 148 | 146 | 146 | 134 | 134 | 150 | 145 |
| DBP absorption (cc/100 g) | 113 | 113 | 127 | 127 | 127 | 127 | 134 | 134 | 157 | 90 |
| DBP/24M4DBP | 1.15 | 1.15 | 1.21 | 1.21 | 1.21 | 1.21 | 1.23 | 1.23 | 1.21 | 0.94 |
| DBP/$N_2SA$ | 0.79 | 0.79 | 0.87 | 0.86 | 0.87 | 0.87 | 1.00 | 1.00 | 1.05 | 0.62 |
| $SiO_2$ | — | 10 | — | 10 | 15 | 10 | — | 10 | 10 | 10 |
| $N_2SA$ ($m^2/g$) | — | 235 | — | 235 | 235 | 200 | — | 235 | 235 | 230 |
| DBP absorption (cc/100 g) | — | 250 | — | 250 | 250 | 140 | — | 250 | 250 | 230 |
| Antioxidant *1 | 1 | 1 | 1 | 1 | 1 | 1 | 1 | 1 | 1 | 1 |
| Stearic acid | 2 | 2 | 2 | 2 | 2 | 2 | 2 | 2 | 2 | 2 |
| Wax | 2 | 2 | 2 | 2 | 2 | 2 | 2 | 2 | 2 | 2 |
| ZnO | 3 | 3 | 3 | 3 | 3 | 3 | 3 | 3 | 3 | 3 |
| Accelerator *2 | 1.1 | 1.1 | 1.1 | 1.1 | 1.1 | 1.1 | 1.1 | 1.1 | 1.1 | 1.1 |
| Sulfur | 1.5 | 1.5 | 1.5 | 1.5 | 1.5 | 1.5 | 1.5 | 1.5 | 1.5 | 1.5 |
| Law heat built-up | 100 | 96 | 95 | 95 | 90 | 98 | 101 | 100 | 83 | 105 |
| Wear resistance | 100 | 101 | 106 | 121 | 128 | 107 | 112 | 127 | 120 | 95 |
| Appearance | B | B | B | A | A | B | B | A | C | B |

*1: Noclac 6C (trademark) manufactured by Ouchi Shinko Kagaku Co., Ltd.
*2: Noccelar CZ (trademark) manufactured by Ouchi Shinko Kagaku Co., Ltd.

In each Example, the wear resistance and the appearance are largely improved without degradation of the low heat build-up.

As explained above, in the invention the wear resistance and the appearance are extremely improved while the low heat build-up is kept.

What is claimed is:

1. A heavy duty pneumatic tire comprising a tread made of a rubber composition comprising 20–67 parts by weight of carbon black and 3–20 parts by weight of silica based on 100 parts by weight of diene based rubber, wherein the carbon black has a ratio of dibutyl phthalate (DBP) absorption to 24M4DBP absorption (DBP absorption/24M4DBP absorption) of not less than 1.20 and not more than 1.30 and a ratio of DBP absorption to nitrogen absorption specific area ($N_2SA$) of not less than 0.8 and the silica has a dibutyl phthalate (DBP) absorption of 200–260 ml/100 g and a nitrogen adsorption specific area ($N_2SA$) of 210–260 $m^2/g$.

2. A heavy duty pneumatic tire according to claim 1, wherein the carbon black has a nitrogen adsorption specific area ($N_2SA$) of 120–160 $m^2/g$ and a dibutyl phthalate (DBP) absorption of 120–150 ml/100 g.

3. A heavy duty pneumatic tire according to claim 1, wherein the ratio of the DBP absorption to the $N_2SA$ of the carbon black is 0.82–2.00.

4. A heavy duty pneumatic tire according to claim 1, wherein the diene based rubber contains not less than 80% by weight of natural rubber as a rubber ingredient.

5. A heavy duty pneumatic tire according to claim 1, wherein the diene based rubber is mainly composed of natural rubber and styrene-butadiene copolymer rubber.

* * * * *